March 29, 1966 RYOSUKE NAMAZU ET AL 3,243,320

METHOD OF PRODUCING SEMICONDUCTOR DENDRITES
HAVING BOTH PLANES UNIFORM

Filed March 18, 1963

United States Patent Office 3,243,320

Patented Mar. 29, 1966

3,243,320
METHOD OF PRODUCING SEMICONDUCTOR DENDRITES HAVING BOTH PLANES UNIFORM

Ryosuke Namazu, Setagayaku, Tokyo, and Tatsuo Honda, Kawasaki-shi, Japan, assignors to Fujitsu Limited, Kawasaki, Japan, a corporation of Japan Filed Mar. 18, 1963, Ser. No. 265,930
3 Claims. (Cl. 148—1.6)

Our invention relates to a method of producing uniform two-plane semiconductor dendrites having both planes uniform. Our invention more particularly relates to a process of preparing said semiconductor dendrites having uniform planes by thinning a portion of the dendrites having uniform planes by thinning a portion of the dendrite by controlled variation of the lifting speed and temperature of the molten semiconductor material.

In the past, it has been difficult to prepare dendrites having both planes uniform and atomically smooth by the conventional methods of producing semiconductor dendrites. One can, by conventional techniques, grow a dendrite having only one atomically smooth crystal plane. Consequently, the material is unsuitable for semiconductor purposes or the range of application is extremely limited.

Our invention has as an object a process which eliminates the above-mentioned deficiencies in the production of semiconductor dendrites. We have succeeded in overcoming the existing deficiencies with the result that both planes are uniform and atomically smooth. This is accomplished by growing the twin plane without being closed at both edges of the dendrite. This is accomplished by making a portion of the crystal slender and thin during the crystal growth. This is done by changing the growing speed of a dendrite by precisely controlling the dendrite lifting speed and/or the temperature of the molten supercooled semiconductor material during the process of growth. Thereafter, the external growing conditions are changed so as to permit the dendrite again to grow to the necessary width and thickness. This has the result that the twin plane is not enclosed within the dendrite. The process of our invention is particularly applicable to materials such as silicon and germanium.

Figure 1:
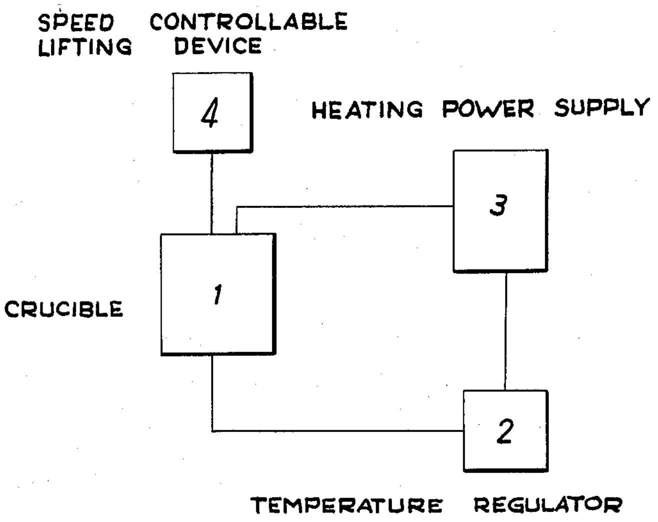

In the accompanying figures:

FIG. 1 constitutes a block diagram illustrating the conventional production of semiconductor dendrites.

Figure 2:
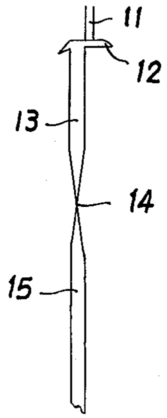

FIG. 2 illustrates schematically the front view showing the variation of the dendrite shape for each position of the plane (111) of a semiconductor dendrite produced by the process of the present invention.

Figure 3:
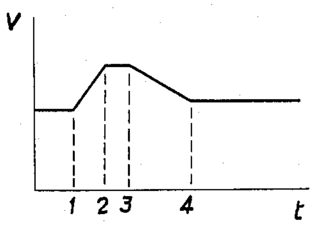

FIG. 3 constitutes a diagram showing the variation of the lifting speed when proceeding in accordance with this invention.

Figure 4:
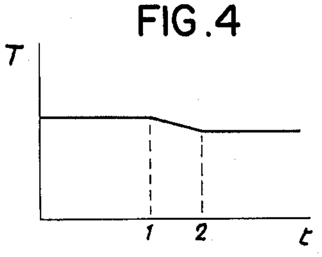

FIG. 4 constitutes a diagram of the variation of temperature of the molten semiconductor material.

Figure 5:
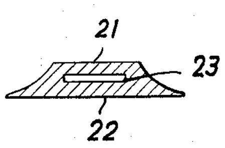

FIG. 5 schematically illustrates a cross section of a semiconductor dendrite of the type produced in FIG. 1.

Figure 6:
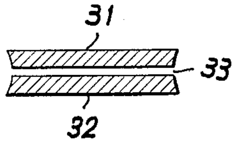

FIG. 6 illustrates schematically a cross section of a semiconductor dendrite produced according to the instant invention.

The growth of dendritic crystals is known. Illustratory of this growth is the article entitled "Dendritic Growth of Germanium Crystals," by Bennett and Longini in Physical Review, volume 116, October 1959, pages 53 to 61. According to conventional techniques, as illustrated in FIG. 1, molten semiconductor material in a crucible 1 surrounded by an inactive or inert gaseous atmosphere such as argon or helium together with means for lifting the grown dendrite and an automatic temperature control device for maintaining the temperature of the molten semiconductor material at a predetermined temperature, and a heating device such as a radio frequency generator or resistive heater 3 for melting the semiconductor material in the crucible 1 together with a speed control device 4 for controlling the lifting speed of the growing dendrite. According to conventional techniques, a single semiconductor crystal is used as a seed or nucleus of twin semiconductor dendrites which is dipped into the molten material heated within furnace 1, and the temperature of this seed also reaches the melting temperature. The temperature of the molten material is then lowered by precise control of an automatic temperature control device to a supercooled state until a button is produced and there grows the dendrite. The lifting speed of the growing dendrite is controlled by regulator 4 to a speed of 20 to 40 mm./minute.

In FIG. 2 a seed crystal of twin plane semiconductor material is shown at 11; 12 and 13 respectively show the button and dendrite thus produced. Thus far the figure describes that which is already known. According to the instant invention, however, the dendrite is grown until it has a predetermined thickness by first increasing the lifting speed of the dendrite using the speed control device 4 of FIG. 1. Thereafter, the speed is decreased to thin the dendrite as illustrated at 14 in FIG. 2. This variation of speed is illustrated in FIG. 3, in which the horizontal axis indicates time and the vertical axis indicates lifting speed or velocity. During the stage where the speed is being decreased, which stage corresponds to the interval of time between 3 and 4 of this figure, the temperature of the supercooled molten material is lowered by about 1 or 2° C. by the automatic precision temperature controller as illustrated in FIG. 1.

When controlled by raising speed of crystal the speed should be increased as much as 10–60 mm./min. than the normal raising speed (30–350 mm./min.). Generally increased speed of 10–30% than the normal speed is used. For instance when normal raising speed of crystal is 80–100 mm./min. at 1 mm. crystal width the raising speed should be increased up to 110–130 mm./min. for 5–6 seconds. Furthermore if crystal width is 2 mm. the raising speed should be increased up to 160–200 mm./min. for 5–6 seconds. This facilitates the growth of the width of the dendrite.

It is possible to achieve this purpose by controlling only the temperature of the molten material. In this case, the invention is actually executed according to the temperature change of the degree of super cooling of the semiconductor solution. The supercooling is between 2–10° C., however, the temperature is increased temporarily 0.5–2° C. above its super cooled condition and then lowered again to the original temperature or slightly lower than that.

It is also more effective to accomplish this purpose concurrently controlling both the lifting speed and the temperature of the molten material. In FIGURE 2, the length that the semiconductor crystal starts to become smaller and return to original size is approximately 5–50 mm.

According to the invention, it is possible to make dendrites having two atomically smooth planes, which are uniform in width, by growing the twin plane up to the edges of the crystals by thinning the crystal during the disclosed process of the dendrites by either the technique of controlling the temperature or the technique of controlling the lifting speed. In other words, a dendrite made by ordinary operation does not have a uniform width in both planes 21 and 22 as illustrated in FIG. 5 but the twin plane 23 included in the inside of these planes is closed and does not reach those edges. While plane 22 is atomically smooth, plane 21 is often not. The thickness of the dendrite is therefore ordinarily increased with the growth. This is due to the fact that the twin plane which is necessary to grow the dendrite, does not exist in the vicinity of both edges of the crystal.

By the present invention it is possible to have the twin plane 23 as shown in FIG. 5 as being closed reach both edges as illustrated at 33 in FIG. 6. This corresponds to the thin portion 14 of FIG. 2 and satisfies the necessary condition for stable dendritic growth. It therefore becomes possible to obtain a dendrite having a uniform width and atomic smoothness in both planes 31 and 32 of FIG. 6 by the means of growing a crystal of predetermined dimensions by lifting the crystal at a speed which will not disturb the crosswise growth of a twin plane. Such a speed would be within 30 to 350 mm./second. Generally the crystal-growth speed varies according to the length, width and thickness of the crystal and it also varies according to the temperature and particular material involved. The present invention, however, is applicable to various dendritic crystals irregardless of the dimensions or the temperature of growing.

We claim:

1. The process of producing a semiconductor dendrite having both planes uniform, which comprises immersing a seed crystal into molten semiconductor material, supercooling the melt from 2 to 10° C. while simultaneously pulling the seed crystal from the melt at a first speed between 30 to 350 mm./sec., increasing the pulling speed by about 10 to 30% for about 5 seconds and again pulling at said first speed, whereby the twin plane within the growing dendrite crystal reaches both sides thereof.

2. The process of producing a semiconductor dendrite having both planes uniform, immersing a seed crystal into molten semiconductor material, supercooling the melt about 2 to 10° C. while simultaneously pulling a dendrite of about 1 mm. wide at a speed of about 80 to 100 mm./min., increasing the pulling speed to about 110 to 130 mm./min. for about 5 seconds and returning the pulling speed to about 80 to 100 mm./min., whereby the twin plane within the growing dendrite reaches both sides thereof.

3. The process of producing a semiconductor dendrite having both planes uniform, which comprises immersing a seed crystal into molten semiconductor material, supercooling the melt from 2 to 10° C. while simultaneously pulling the seed crystal from the melt at a speed between 30 to 350 mm./sec., decreasing the supercooling by about 0.5 to 2° C. and thereafter increasing the supercooling to its original value, whereby the twin plane within the growing dendrite crystal reaches both sides thereof.

References Cited by the Examiner

UNITED STATES PATENTS

| | | | |
|---|---|---|---|
| 3,031,403 | 4/1962 | Bennett | 148—1.6 |
| 3,129,061 | 4/1964 | Dermatis, et al. | 148—1.6 |

OTHER REFERENCES

Bennett et al.: article in the Physical Review, vol. 116, pages 53–61, October 1, 1951.

Chalmes: "Melting and Freezing," Trans. AIME, May 1954, pages 519–532.

Longini et al.: article in the Journal of Applied Physics, volume 31, July 1960, pages 1204–1207.

Metallurgy of Elemental and Compound Semiconductors, AIME Publ., Interscience Publishers, N.Y. (1961), pages 169–176.

Metallurgy of Elemental and Compound Semiconductors, AIME Publication, Interscience Publishers, N.Y. (1961), pages 195–199.

DAVID L. RECK, *Primary Examiner.*

N. F. MARKVA, *Assistant Examiner.*